US007106448B1

(12) United States Patent  
Vawter et al.

(10) Patent No.: US 7,106,448 B1
(45) Date of Patent: Sep. 12, 2006

(54) INTEGRATED RESONANT MICRO-OPTICAL GYROSCOPE AND METHOD OF FABRICATION

(75) Inventors: G. Allen Vawter, Albuquerque, NM (US); Walter J. Zubrzycki, Sandia Park, NM (US); Junpeng Guo, Albuquerque, NM (US); Charles T. Sullivan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 312 days.

(21) Appl. No.: 10/780,799

(22) Filed: Feb. 17, 2004

(51) Int. Cl.
*G01C 19/72* (2006.01)
*G02B 6/02* (2006.01)

(52) U.S. Cl. .................... 356/461; 385/12
(58) Field of Classification Search .......... 356/461, 356/465, 462; 385/12; 372/94
See application file for complete search history.

(56) References Cited

U.S. PATENT DOCUMENTS

| 4,326,803 | A |   | 4/1982 | Lawrence |
| 4,661,964 | A | * | 4/1987 | Haavisto ............... 356/461 |
| 5,327,215 | A | * | 7/1994 | Bernard et al. ........ 356/461 |
| 5,408,492 | A |   | 4/1995 | Vossler et al. |
| 5,872,877 | A | * | 2/1999 | Haavisto ............... 385/12 |
| 6,259,089 | B1 |  | 7/2001 | Vali et al. |
| 6,587,205 | B1 |  | 7/2003 | Goldner et al. |
| 6,613,596 | B1 |  | 9/2003 | Bloemer et al. |

FOREIGN PATENT DOCUMENTS

GB    2 178 526 A  *  2/1987

JP    363023211 A  *  2/1988

OTHER PUBLICATIONS

Recent Developments in Silicon Optoelectronic Devices, Wonk, International Confrence on Microelectronics, IEEE, May 2002, pp. 285-292.*
W. Stutius and W. Streifer, "Silicon nitride films on silicon for optical waveguides," Applied Optics, vol. 16, No. 12, Dec. 1997, pp. 3218-3222.
C. H. Henry, et al, "Low Loss $Si_3N_4$-$SiO_2$ optical waveguides on SI", Applied Optics, vol. 26, No. 13, Jul. 1987, pp. 2621-2624.
G. N. De Brabander, et al, "Single Polarization Optical Waveguide on Silicon," IEEE Journal of Quantum Electronics, vol. 27 No. 3 Mar. 1991 pp. 575-579.
Kenya Suzuki et al, "Monolithically Integrated Resonator Microoptic Gyro on silica Planar Lightwave Circuit," Journal of Lightwave Technology, vol. 18, No. 1, Jan. 2000, pp. 66-72.

(Continued)

*Primary Examiner*—Gregory J. Toatley, Jr.
*Assistant Examiner*—Patrick Connolly
(74) *Attorney, Agent, or Firm*—John P. Hohimer

(57) ABSTRACT

An integrated optic gyroscope is disclosed which is based on a photonic integrated circuit (PIC) having a bidirectional laser source, a pair of optical waveguide phase modulators and a pair of waveguide photodetectors. The PIC can be connected to a passive ring resonator formed either as a coil of optical fiber or as a coiled optical waveguide. The lasing output from each end of the bidirectional laser source is phase modulated and directed around the passive ring resonator in two counterpropagating directions, with a portion of the lasing output then being detected to determine a rotation rate for the integrated optical gyroscope. The coiled optical waveguide can be formed on a silicon, glass or quartz substrate with a silicon nitride core and a silica cladding, while the PIC includes a plurality of III–V compound semiconductor layers including one or more quantum well layers which are disordered in the phase modulators and to form passive optical waveguides.

39 Claims, 5 Drawing Sheets

OTHER PUBLICATIONS

Sabina Merlo, et al, "Fiber Gyroscope Principles," Handbook of Fibre Optic Sensing Technology, 2000 John Wiley & Sons, Ltd. Chapter 16, pp. 1-23.

G. Allen Vawter, et al, "Developments in Pursuit of a Micro-Optic Gyroscope," SAND Report No. 2003-0665, Mar. 2003 pp. 1-39.

* cited by examiner

INTEGRATED RESONANT MICRO-OPTICAL GYROSCOPE AND METHOD OF FABRICATION

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to optical rotation rate sensors (also termed optical gyroscopes or optical gyros), and in particular to an optical gyroscope comprising a photonic integrated circuit.

BACKGROUND OF THE INVENTION

Accurate sensing of angular velocity is an essential element in the guidance and control of vehicles of many types including land vehicles, manned or unmanned aircraft, guided missiles and smart munitions. Many types of partially or completely integrated optical gyroscopes have been disclosed in attempts to provide a rotation rate sensor having certain advantages over conventional rotating mass gyroscopes in terms of improved reliability and robustness, reduced size and power, and lower cost (see e.g. U.S. Pat. Nos. 4,326,803; 5,327,215; 5,408,492; 6,259,089; and 6,587,205 which are incorporated herein by reference).

Optical gyroscopes (i.e. gyros) are based on the well-known Sagnac effect which defines a linear relationship between the rotation rate of light propagating in a circuital path and a phase shift $\Delta\phi$ of the light propagating around the path in opposite directions given by:

$$\Delta\phi = \frac{8\pi A \Omega}{\lambda c}$$

where A is the area of the circuital path, $\Omega$ is the angular rotation rate, $\lambda$ is the wavelength of the light, and c is the speed of light. The phase shift $\Delta\phi$ of the light for a given rotation rate $\Omega$ can be increased N-fold when the circuital path with the area A is looped around N times. A further increase in sensitivity of the optical gyroscope can be achieved when the circuital path forms a resonator. In this case, the phase shift $\Delta\phi$ will be increased by a finesse, F, of the resonator. Further details of the operation of various types of optical gyroscopes can be found in a book chapter by S. Merlo et al entitled "Fiber Gyroscope Principles" (in *Handbook of Fibre Optic Sensing Technology*, chapter 16, John Wiley & Sons, Ltd., 2000).

The integrated optical gyroscope of the present invention with a bidirectional laser source, phase modulators and waveguide detectors formed as a photonic integrated circuit (PIC) on a compound semiconductor substrate and with a passive ring resonator formed separately and attached thereto represents an advance in the art which is expected to provide many of the advantages listed above while being more easily fabricable using current technology than a completely-integrated device with the passive ring resonator formed on the same substrate as the PIC.

These and other advantages of the present invention will become evident to those skilled in the art.

SUMMARY OF THE INVENTION

The present invention relates to an integrated optic gyroscope that comprises a bidirectional laser source formed on a compound semiconductor substrate to provide a lasing output from each end thereof, a pair of optical waveguide phase modulators also formed on the substrate to provide a phase modulation for each lasing output from the bidirectional laser source, and a plurality of passive optical waveguides formed on the substrate to direct each lasing output to an edge thereof after passing through one of the optical waveguide phase modulators. The integrated optical gyroscope also comprises a passive ring resonator that is adapted to receive each lasing output from the edge of the compound semiconductor substrate, to propagate each lasing output around the resonator in a different direction, and to direct a portion of each lasing output out of the resonator after propagating around the resonator. A pair of waveguide photodetectors, which are also formed on the compound semiconductor substrate and optically coupled to the edge thereof, can then receive the portion of each lasing output from the passive ring resonator and generate therefrom output electrical signals that can be used to determine a rotation of the passive ring resonator.

The passive ring resonator can comprise either an optical fiber, or a coiled optical waveguide formed on another substrate (e.g. comprising silicon, glass, or quartz). In embodiments of the present invention where the passive ring resonator is provided as an optical fiber, the integrated optic gyroscope can further include a fiber optic splitter to couple each lasing output into the passive ring resonator, and to couple the portion of each lasing output out of the passive ring resonator after propagating around the resonator.

In other embodiments of the present invention where the integrated optic gyroscope comprises a coiled optical waveguide formed on another substrate (e.g. comprising silicon, glass or quartz), an adiabatic mode-matching region can be provided on this other substrate proximate to an edge thereof to optically couple the passive ring resonator to the passive optical waveguides on the compound semiconductor substrate. The coiled optical waveguide can comprise a waveguide core of silicon nitride surrounded by a waveguide cladding of silica, and generally further includes a waveguide crossing. The coiled optical waveguide is preferably a single-mode waveguide, with the coiled optical waveguide transmitting the lasing output in a transverse-electric (TE) polarization state while suppressing the transmission of the lasing output in a transverse-magnetic (TM) polarization state. The passive ring resonator can further include a 2×2 evanescent waveguide coupler and a pair of 1×2 lateral mode interference splitters to couple each lasing output into the passive ring resonator, and to couple the portion of each lasing output out of the resonator after propagating around the resonator.

The bidirectional laser source in the integrated optic gyroscope can comprise a distributed feedback (DFB) laser. The bidirectional laser source and the waveguide photodetectors can all be formed from a plurality of compound semiconductor layers epitaxially deposited on the compound semiconductor substrate, with the plurality of compound semiconductor layers including one or more quantum wells. Each passive optical waveguide and the phase modulators can also be formed from the same compound semiconductor layers with each quantum well therein being disordered or etched away. An ion-implanted region can also be formed between the bidirectional laser source and each phase modulator to provide electrical isolation between these elements, with the ion-implanted region extending partway through the compound semiconductor layers.

The compound semiconductor substrate and the silicon, glass or quartz substrate can each include one or more alignment waveguides formed thereon to facilitate alignment of each passive optical waveguide on the compound semiconductor substrate to the passive ring resonator on the silicon, glass or quartz substrate in preparation for attaching the substrates together edge-to-edge. The two substrates can then be attached together using a UV-cured epoxy adhesive. The compound semiconductor substrate can further include an alignment laser or an alignment photodetector or both optically coupled to at least one of the plurality of alignment waveguides on the compound semiconductor substrate.

The present invention further relates to an integrated optic gyroscope comprising a passive ring resonator formed on a first substrate, and a photonic integrated circuit (PIC) formed on a second substrate, with the two substrates being attached together. The passive ring resonator further comprises a coiled optical waveguide having a plurality of loops, a pair of input optical waveguides optically coupled to the coiled optical waveguide to receive lasing light from an edge of the first substrate and to convey the lasing light into the coiled optical waveguide in each of two counterpropagating directions; and a pair of output optical waveguides coupled to the coiled optical waveguide to receive a portion of the lasing light out from the coiled optical waveguide and to convey the portion of the lasing light to the edge of the first substrate after propagating around the coiled optical waveguide. The PIC formed on the second substrate comprises a bidirectional distributed feedback (DFB) laser to generate the lasing light and to emit the lasing light from each end thereof, a pair of optical waveguide phase modulators optically coupled to each end of the DFB laser to phase modulate the lasing light, a passive optical waveguide to convey the lasing light from each phase modulator to an edge of the second substrate wherefrom the lasing light is coupled into the input optical waveguides on the first substrate, and a waveguide photodetector to receive the portion of the lasing light from each output optical waveguide on the first substrate and generate therefrom an electrical output signal indicative of a rotation rate of the passive ring cavity.

The first substrate can comprise silicon, glass or quartz; and the second substrate can comprise a III–V compound semiconductor (e.g. GaAs or InP). The passive ring resonator, and each input and output optical waveguide can comprise a waveguide core of silicon nitride surrounded by a waveguide cladding of silica (i.e. silicon dioxide or a silicate glass). The passive ring resonator is preferably made birefringent to transmit the lasing light from the DFB laser in a transverse electric (TE) mode while attenuating any transmission of the lasing light in a transverse magnetic (TM) mode. The coiled optical waveguide can also include one or more waveguide crossings.

The input optical waveguides and the output optical waveguides can be optically coupled to the coiled optical waveguide through a 2×2 evanescent waveguide coupler. A pair of 1×2 lateral mode interference splitters can also be used to optically couple the input and output optical waveguides to the coiled optical waveguide. An adiabatic mode-matching region can be formed proximate to the edge of the first substrate to facilitate coupling of the input and output optical waveguides on the first substrate to the passive optical waveguides on the second substrate.

The PIC can comprise a plurality of III–V compound semiconductor layers which include a pair of low-refractive-index cladding layers sandwiched about a high-refractive-index core layer. The high-refractive-index core layer can further include one or more quantum wells therein, with the quantum wells being intact in the DFB laser and in the waveguide photodetectors, and being disordered or etched away within the phase modulators and passive optical waveguides. A grating can also be formed in one of the low-refractive-index cladding layers of the DFB laser, with an etch-stop layer being optionally formed below the grating. An electrical isolation region can also be provided between each phase modulator and the DFB laser.

The first and second substrates can be attached together at the edges thereof (e.g. with a UV-cured epoxy adhesive). To facilitate alignment of the input and output optical waveguides on the first substrate to the passive optical waveguides on the second substrate in preparation for attaching the substrates together, a plurality of alignment waveguides can be provided on each of the substrates. Additionally, an alignment laser can be formed on the second substrate and optically coupled to one or more of the alignment waveguides on the first substrate. The second substrate can also include an alignment photodetector optically coupled to a curved alignment waveguide on the second substrate to detect lasing light from the alignment laser.

The present invention also relates to a method for forming an integrated optic gyroscope. This method comprises steps for epitaxially growing on a compound semiconductor substrate a plurality of compound semiconductor layers including at least one quantum well layer; forming a plurality of active optical elements from the compound semiconductor layers including a bidirectional laser source, a pair of optical waveguide phase modulators optically coupled to the bidirectional laser source, and a pair of waveguide photodetectors; disordering or etching away a portion of the compound semiconductor layers and forming therefrom a plurality of passive optical waveguides, with the passive optical waveguides connecting the pairs of phase modulators and waveguide photodetectors to an edge of the compound semiconductor substrate; and connecting a passive ring resonator to the edge of the compound semiconductor substrate, with the passive ring resonator being optically coupled to the passive optical waveguides to receive a phase-modulated lasing output from each phase modulator, and to direct a portion of the phase-modulated lasing output to each waveguide photodetector after propagating around the passive ring resonator. The passive ring resonator, which can comprise an optical fiber or a coiled optical waveguide formed on another substrate, can be attached to the compound semiconductor substrate with an adhesive (e.g. a UV-cured epoxy).

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
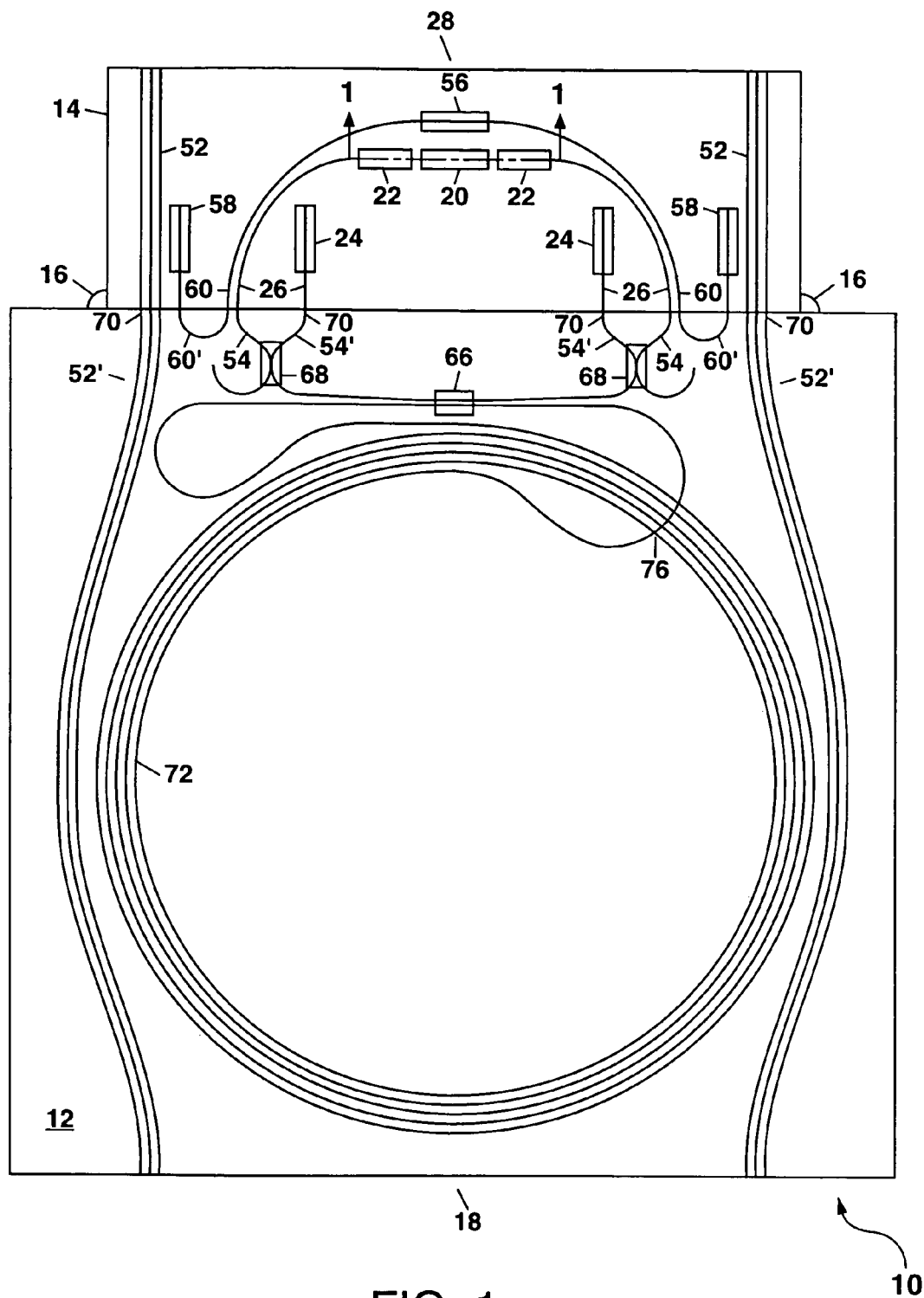
FIG. 1 shows a schematic plan view of a first example of the integrated optic gyroscope of the present invention.

Referring to FIG. 1, there is shown a schematic plan view of a first example of an integrated optic gyroscope 10 formed according to the present invention. The integrated optic gyroscope 10 comprises a pair of substrates 12 and 14 which are processed separately to form elements of the apparatus 10 thereon, and which are then attached together with an adhesive 16 (e.g. a epoxy adhesive that is cured with ultraviolet light, also termed a UV-cured epoxy). One of the substrates 12 comprises silicon (e.g. a monocrystalline silicon substrate), glass or quartz (i.e. crystalline quartz or fused silica); and the other substrate 14 comprises a compound semiconductor substrate which can be formed, for example, from a III–V compound semiconductor material such as gallium arsenide (GaAs) or indium phosphide (InP).

Figure 5:
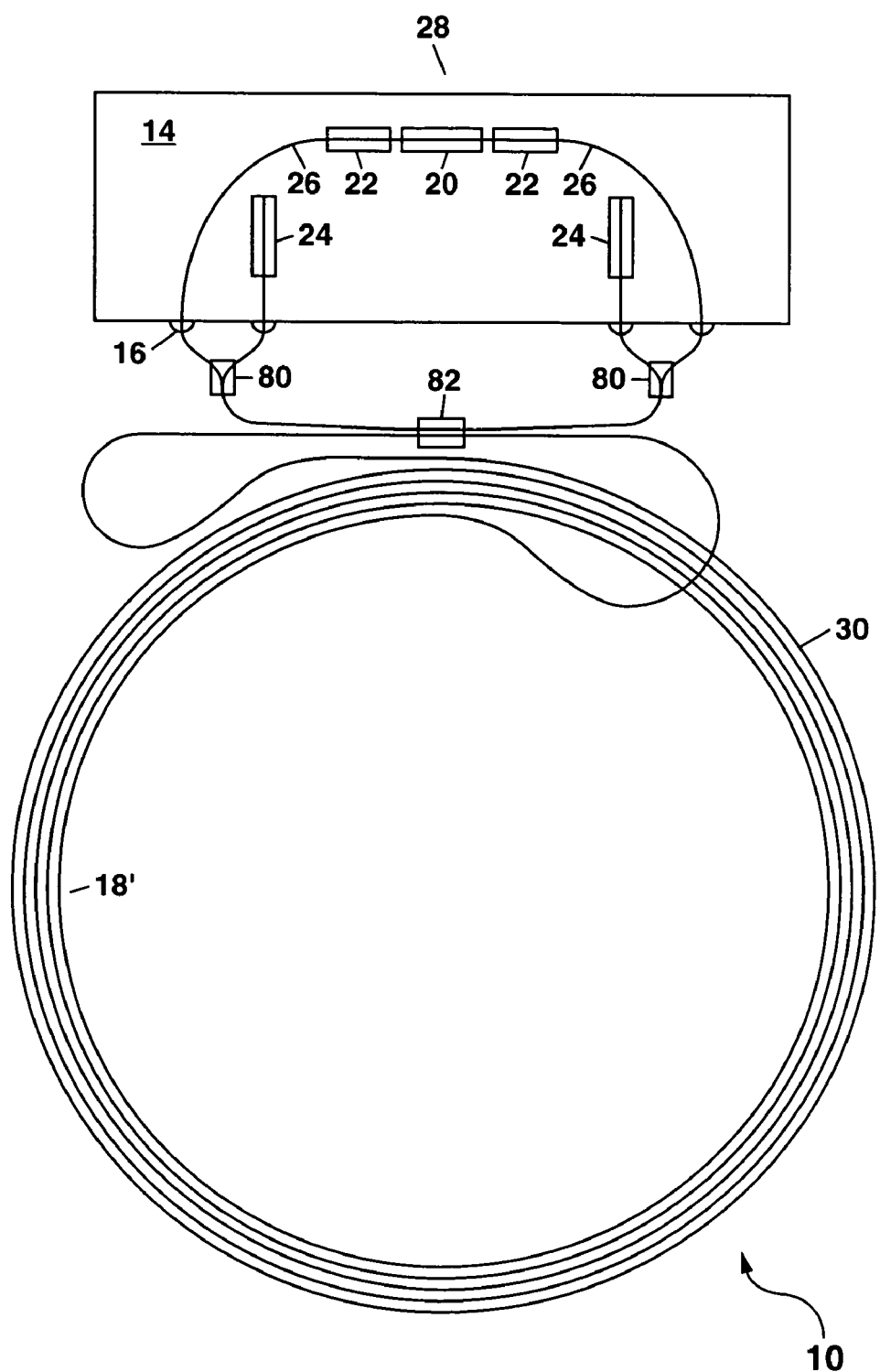
FIG. 5 shows a schematic plan view of a second example of the integrated optic gyroscope of the present invention.

By utilizing two substrates 12 and 14, the various optical elements on each substrate 12 or 14 can be optimized in terms of performance and manufacturing cost. The silicon, glass or quartz substrate 12 allows the formation of passive optical components including a relatively long passive ring resonator 18 with a low waveguide transmission loss, and at a lower cost than would generally be possible using a compound semiconductor substrate. Additionally, the compound semiconductor substrate 14 allows the formation of certain active optical elements including a bidirectional laser source 20 which cannot easily be formed on the other substrate 12 due to the lack of a direct energy bandgap in the silicon, glass or quartz. Other active optical elements including a pair of optical waveguide phase modulators 22 and a pair of waveguide photodetectors 24 and a plurality of passive optical waveguides 26 can also be provided on the compound semiconductor substrate 14 to form a photonic integrated circuit (PIC) 28 which can used be in combination with the passive ring resonator 18 formed on the silicon, glass or quartz substrate 12, or alternately in combination with a passive ring resonator 18' formed from an optical fiber 30 as shown in FIG. 5.

To form the PIC 28 in FIG. 1, a plurality of III–V compound semiconductor layers can be epitaxially grown on the compound semiconductor substrate 14 by an epitaxial growth method such as molecular beam epitaxy (MBE) or metalorganic chemical vapor deposition (MOCVD), both of which are well-known in the art and therefore need not be described here in detail. These epitaxial layers, which are shown in the schematic cross-section view in FIG. 2A taken along the section line 1—1 in FIG. 1, include a pair of low-refractive-index cladding layers including a lower cladding layer 32 and an upper cladding layer 32' which are sandwiched about a high-refractive-index core layer 34. The core layer 34 also preferably includes one or more quantum wells 36 therein. Those skilled in the art will understand that the term "quantum well" refers to a thin epitaxial layer about 30 nanometers thick or less wherein a quantum confinement of carriers (i.e. electrons and holes) occurs. Also, the terms "low-refractive-index" and "high-refractive-index" are used herein to indicate the existence of a difference Δn in the refractive index between the cladding layers 32 and 32' and the core layer 34 which is used for optical waveguiding in a direction normal to the plane of the substrate 14.

One of the cladding layers 32 or 32' can be doped n-type, and the other cladding layer can be p-type doped, with the dopant concentration in each cladding layer 32 and 32' generally being in the range of $1-5\times10^{17}$ cm$^{-3}$. The core layer 34 can be undoped (i.e. intrinsic) to form a p-i-n structure in the epitaxial layers. The compound semiconductor substrate 14 can be doped the same type as the lower cladding layer 32, with the dopant concentration in the substrate 14 being, for example, on the order of $10^{18}$ cm$^{-3}$.

Figure 2A:
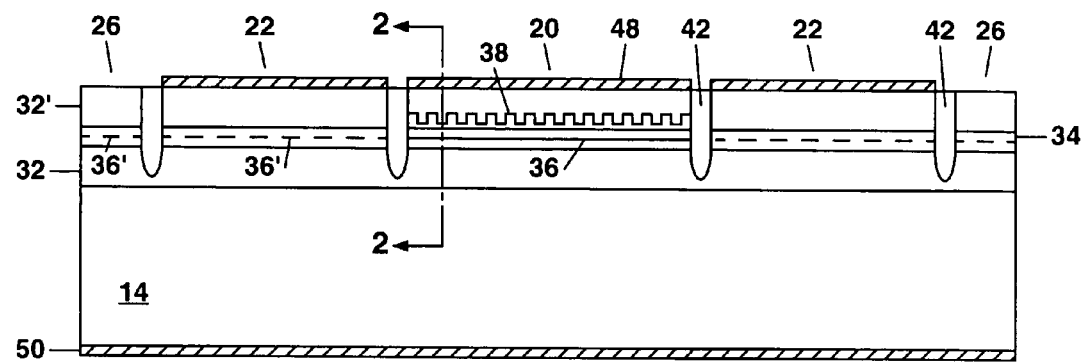
FIG. 2A shows a schematic cross-section view taken along the section line 1—1 in FIG. 1 to illustrate formation of the bidirectional laser source, the optical waveguide phase modulators and the passive optical waveguides all formed from a plurality of epitaxially-deposited compound semiconductor layers.

Those skilled in the art will understand that additional epitaxial layers can be provided which are not shown in FIG. 2A including a buffer layer having the same semiconductor alloy composition as the substrate 14 and located between the substrate 14 and the lower cladding layer 32; and a heavily doped (e.g. to $10^{18}-10^{19}$ cm$^{-3}$) cap layer above the upper cladding layer 32'. Additionally, one or more etch-stop layers can be optionally provided to facilitate the formation of a rib structure 44 used for lateral definition of the laser source 20, phase modulators 22, waveguide photodetectors 24 and passive optical waveguides 26 so that these elements all operate in a single mode.

As an example, to form the PIC 28 at an operating wavelength near 980 nanometers, the compound semiconductor substrate 14 can comprise gallium arsenide (GaAs), the cladding layers 32 and 32' can comprise aluminum gallium arsenide (AlGaAs), the waveguide core layer 34 can comprise GaAs, and each quantum well 36 can comprise indium gallium arsenide (InGaAs) which can be strained due to a slight lattice mismatch to the surrounding GaAs and AlGaAs and to the GaAs substrate 14. Each AlGaAs cladding layer 32 and 32' can be, for example, 1.5 μm thick. The core layer 34 can be, for example, 0.2 μm thick and can be optionally graded in semiconductor alloy composition (e.g. from $Al_{0.3}Ga_{0.7}As$ to GaAs) to form a graded-index separate confinement heterostructure (GRINSCH) structure. Each InGaAs quantum well 36 can be, for example, 8 nanometers (nm) thick. When multiple InGaAs quantum wells 36 are utilized, each adjacent pair of the InGaAs quantum wells 36 can be separated by a GaAs barrier layer which can be, for example, 10 nm thick. Using MOCVD, each GaAs or InGaAs layer above can be epitaxially grown at a temperature of about 620° C., and each AlGaAs layer can be grown at a temperature of about 720° C.

To form the PIC 28 for operation at a wavelength near 1.55 µm, the compound semiconductor substrate 14 can comprise indium phosphide (InP), with the various layers 32, 32', 34 and each quantum well 36 being formed from different compositions of indium gallium arsenide phosphide (InGaAsP) and with the exact InGaAsP semiconductor alloy compositions for the layers 32, 32' and 34 being selected so that the refractive index for the layers 32 and 32' is less than that for the core layer 34, and with the InGaAsP composition of each quantum well 36 being selected to provide an energy bandgap near 1.55 µm. After a distributed Bragg reflector (DBR) grating 38 has been formed as described hereinafter, an iron-doped InP layer can be regrown over the grating 38.

After epitaxial growth of the various layers used to form the photonic integrated circuit 28, an etch mask can be formed over the compound semiconductor substrate 14 in preparation for etching partway down through the upper cladding layer 32' to form the DBR grating 38 at the location of the bidirectional laser source 20. The etching can be performed, for example, using chlorine reactive ion beam etching. The etch mask can be formed photolithographically or by direct e-beam writing as known to the art, with the DBR grating 38 comprising a plurality of teeth each with a width substantially equal to one-quarter-wavelength of the lasing to be generated with the source 20, and with adjacent teeth generally being uniformly spaced by one-quarter-wavelength of the lasing. The teeth can be, for example, 80 nm deep. The bidirectional laser source 20 can be, for example, 400 µm long and operates single frequency with a linewidth that is preferably on the order of 3 MHz or less, and most preferably 1 MHz or less.

To facilitate formation of the DBR grating 38 an etch-stop layer (not shown) can be epitaxially grown in the upper cladding layer 32' with a semiconductor alloy composition that is different from the remainder of the layer 32'. As an example, when the upper cladding layer 32' comprises AlGaAs, the etch-stop layer can comprise indium gallium phosphide (InGaP), with the InGaP etch-stop layer being, for example, 20 nm thick. The etch-stop layer allows the upper cladding layer 32' to be etched down to a precise depth with the etch-stop layer also providing a passivated surface upon which epitaxial regrowth can take place (e.g. to form a regrown portion 40 of the upper cladding 32' with a different AlGaAs semiconductor alloy composition). Alternatively, a timed etch can be used to form the DBR grating 38, in which case, a passivation layer (e.g. comprising GaAs) can be provided in the upper cladding 32' so that etching of the DBR grating 38 can terminate at the passivation layer whereupon the epitaxial regrowth can take place with the different AlGaAs semiconductor alloy composition. The epitaxial regrowth can be performed in the same manner as the growth of the cladding layers 32 and 32' (e.g. at about 720° C. using MOCVD).

Once the DBR grating 38 has been formed, selected regions of each quantum well 36 can be locally disordered to reduce the propagation loss of light in the phase modulators 22 and passive waveguides 26 to about 10 dB-cm$^{-1}$ or less. This disordering produces a disordered quantum well 36' having a slightly higher energy bandgap which results in a blue-shift of up to 50 nm or more in an absorption edge therein; and this blue-shift in the absorption edge substantially reduces a transmission loss for light within the waveguide core 34 for the phase modulators 22 and passive optical waveguides 26. In other embodiments of the present invention, another etching step using chlorine reactive ion beam etching can be performed with the etching being timed to etch down through each quantum well 36 in the phase modulators 22 and passive waveguides 26 thereby removing each quantum well 36 from these elements of the PIC 28. The regrown portion 40 can then be used to cover the remainder of the waveguide core 34 in the phase modulators 36 and passive optical waveguides 26.

The passive optical waveguides 26 are used to direct a lasing output, which is generated by the source 20 and passes through one of the phase modulators 22, to an edge of the substrate 14 so that the lasing output can be directed into the passive ring resonator 18. Other passive optical waveguides 26 receive a portion of the lasing output back from the passive ring resonator 18 after traversing around the resonator 18 and direct this portion of the lasing output to one of the waveguide photodetectors 24.

The disordering of each quantum well 36 can be produced, for example, by impurity-free vacancy diffusion which utilizes a silicon dioxide layer deposited over regions of the substrate 14 wherein each quantum well 36 is to be disordered. A silicon nitride layer can be deposited over the remainder of the substrate 14 to protect an upper surface of the compound semiconductor layers during a subsequent rapid thermal annealing step (e.g. at 875–1000° C. for 1–4 minutes) which is used to produce the disordered quantum wells 36'. The silicon dioxide and silicon nitride layers can each be up to about 0.5 µm thick and can be deposited by low-pressure chemical vapor deposition (LPCVD) or plasma-enhanced chemical vapor deposition (PECVD).

During the thermal annealing step, gallium from the compound semiconductor layers diffuses upward into the silicon dioxide layer leaving behind vacancies that then diffuse downward to the quantum wells 36 where the vacancies produce an intermixing of gallium, indium and aluminum from the quantum wells 36 and adjoining layers (e.g. the cladding layers 32 and 32' and any barrier layers). This intermixing changes the semiconductor alloy composition in each disordered quantum well 36' thereby increasing the energy bandgap therein and producing the blue-shift in the absorption edge. In the phase modulators 22 and passive optical waveguides 26 wherein the disordered quantum well 36 is produced, the blue-shift in the absorption edge can be over 50 nm; whereas in areas where the quantum well 36 is not disordered, the absorption edge is generally shifted to a much smaller extent ($\leq 10$ nm).

An alternate process has been developed to allow selective disordering of each quantum well 36 while utilizing a full-surface overlayer of silicon dioxide. This alternate process utilizes a polymer film instead of the silicon nitride layer for protecting regions of the substrate 14 wherein each quantum well 36 is to be preserved from disordering. The polymer film, which can be about up to a few tens of nanometers thick, prevents gallium loss from the epitaxial layers thereby preventing vacancy formation and the resultant intermixing and disordering of the quantum wells 36. The polymer film can be deposited in a reactive ion etching system using a plasma containing methyl fluoride (CHF$_3$) and oxygen (O$_2$) A full-surface layer of silicon dioxide (e.g. about 0.5 µm thick) can be initially be blanket deposited over the substrate 14. A photolithographically-patterned etch mask can then be formed over portions of this silicon dioxide layer which are to be removed to expose the underlying compound semiconductor layers at locations wherein each quantum well 36 is to be protected from disordering. The substrate 14 can then be placed into the reactive ion etching system and the polymer film can be blanket deposited over the entire substrate 14 from the $CHF_3/O_2$ plasma. Another thin (e.g. 100 nm thick) layer of silicon dioxide can then be deposited over the entire substrate 14 to prevent surface decomposition when the annealing step described above is carried out to selectively disorder each quantum well 36 in the phase modulators 22 and passive optical waveguides 26.

An ion implanted region 42 can be formed proximate to one or both ends of each phase modulator 22 as needed to electrically isolate the phase modulator 22 from the adjacent laser source 20 and from the passive optical waveguides 26. The ion implanted region 42 can be formed by implanting hydrogen ions (i.e. protons) or oxygen ions at an energy sufficient to penetrate through at least a majority of the thickness of the upper cladding 32', and if needed through the waveguide core 34 and into the lower cladding 32.

The phase modulators 22, which operate under reverse biasing and which can be modulated at a frequency of up to about 1 GigaHertz (GHz), can be, for example, 150–600 µm long. An applied reverse-bias voltage to each phase modulator 22 produces an electric field across the waveguide core 34 thereby changing the refractive index therein slightly, and this generates a phase shift for the lasing output passing through the phase modulator 22. By modulating the applied reverse-bias voltage, the lasing output can be phase modulated (e.g. to produce a sawtooth serrodyne modulation). Since each quantum well 36 has been disordered or etched away within the phase modulators 22, any absorption of the lasing output is substantially reduced. Each phase modulator 22 preferably has a voltage-phase figure-of-merit of about 25 degrees-volt$^{-1}$-mm$^{-1}$ or better, and provides more than a $2\pi$ phase shift of the lasing output.

Figure 2B:
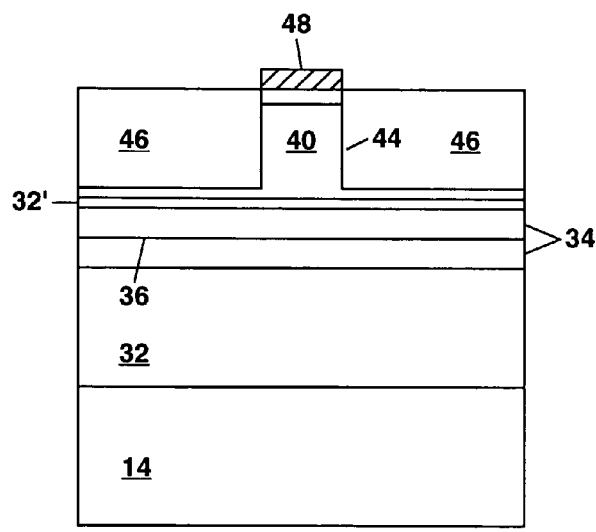
FIG. 2B shows a schematic cross-section view of the bidirectional laser source taken along the section line 2—2 in FIG. 2A to show additional features of the laser source including a rib structure which is common to the optical waveguide phase modulators, waveguide photodetectors and passive optical waveguides.

After disordering or etching away each quantum well 36, a rib structure 44 can be etched down into or through the regrown portion 40 of the upper cladding 32' as shown in FIG. 2B, which is a schematic cross-section view along the section line 2—2 in FIG. 2A. This etching step can also be performed using chlorine reactive beam etching. The rib structure 44 provides lateral mode confinement to form a single-mode optical waveguide for the various elements of the PIC 28 including the bidirectional laser source 20, phase modulators 22, waveguide photodetectors 24 and passive optical waveguides 26. After etching the rib structure 44, which can be 1–3 µm wide, a low-index spacer layer 46 of an electrically-insulating material (e.g. silicon dioxide, silicon nitride, or a polymer such as BCB, PMMA or photoresist) can be deposited over the substrate 14 and etched away over top the active optical elements including the bidirectional laser source 20, each phase modulator 22 and each waveguide photodetector 24. A plurality of patterned upper electrodes 48 can then be formed over each active optical element to provide an electrical connection thereto (e.g. by evaporation or sputtering). A full-surface lower electrode 50 can be provided on an underside of the substrate 14 to form a common electrical connection to these active optical elements.

The waveguide photodetectors 24 can be, for example, 30–50 µm long or more, and can be optically connected to the edge of the substrate 14 through a passive optical waveguide 26 as shown in FIG. 1. The waveguide photodetectors 24 can be operated by applying a reverse-bias voltage of a few volts across the electrodes 48 and 50 to absorb any of the lasing output incident therein after traversing around the passive ring resonator 18 and generate therefrom an electrical output signal. The presence of one or more quantum wells 36 in each waveguide photodetector 24 results in a relatively strong absorption of the lasing output therein and provides a relatively high detection efficiency.

In other embodiments of the present invention, a selective oxidation of one or more high-aluminum-content $Al_xGa_{1-x}$As layers epitaxially grown within the upper cladding 32', or the lower cladding 32, or both with an aluminum content, x, in the range of $0.8 \leq x \leq 1.0$ can be used to provide a lateral mode confinement and a lateral current confinement to define the single-mode optical waveguide for the bidirectional laser source 20, phase modulators 22, waveguide photodetectors 24 and passive optical waveguides 26. In this case, the rib structure 44 can be made several microns wider than the single-mode optical waveguide to be formed, and can be etched down to expose the high-aluminum-content $Al_xGa_{1-x}$As layer(s) on both sides of the rib structure 44. Exposure of the high-aluminum-content $Al_xGa_{1-x}$As layer(s) to an elevated temperature in the range of 350 to 500° C. and to a high humidity environment can then be used to selectively oxidize the high-aluminum-content $Al_xGa_{1-x}$As layer(s) from each side inward over time and to leave an unoxidized portion of the high-aluminum-content $Al_xGa_{1-x}$As layer(s) that can be about 1–3 µm wide. This converts the high-aluminum-content $Al_xGa_{1-x}$As layer(s) to an aluminum oxide (e.g. $Al_2O_3$) while not substantially altering the remainder of the cladding layers 32 and 32' or the regrown layer 40 which have a lower aluminum content (i.e. $Al_xGa_{1-x}$As with $0.3 \leq x \leq 0.6$). The aluminum oxide provides a reduced index of refraction compared to the unoxidized $Al_xGa_{1-x}$As and this lateral index step across the width of the various elements of the PIC 28 defines a single-mode optical waveguide therein.

The high humidity environment can be produced, for example, by flowing nitrogen gas through water heated to about 80–95° C. to entrain water vapor, and then directing the resultant moisture-laden gas into the presence of the heated substrate 14. The exact time required to oxidize each high-aluminum-content $Al_xGa_{1-x}$As layer, which will depend on the temperature to which the substrate 14 is heated, the thickness of each high-aluminum-content $Al_xGa_{1-x}$As layer, and the lateral extent to which each high-aluminum-content $Al_xGa_{1-x}$As layer is to be oxidized, can be learned by practice of the present invention. After the oxidation step, the low-index spacer layer 46 can be deposited over the compound semiconductor substrate 14, and the electrodes 48 and 50 can be formed on each side of the substrate 14 as described previously to complete the PIC 28 which can be about 3×8 millimeters in size.

As shown in FIG. 1, the photonic integrated circuit 28 can also include a plurality of alignment waveguides 52 which can be used to optically align the compound semiconductor substrate 14 to the silicon, glass or quartz substrate 12 immediately prior to attaching these two substrates together edge-to-edge. The alignment waveguides 52 can be formed identically to the passive optical waveguides 26 with one or more disordered quantum wells 36' therein. Although not shown in FIG. 1, each passive optical waveguide 26 and each alignment waveguide can be tilted slightly (up to about 10 degrees) with respect to the edge of the compound semiconductor substrate 14 to reduce a back reflection of the lasing light at the edge of the substrate 14.

Light from an external source (e.g. a laser, light-emitting diode, lamp or fiber optic light source) can be directed through one or more of the alignment waveguides 52 on each side of the compound semiconductor substrate 14 and therefrom through a plurality of identically-spaced alignment waveguides 52' formed with a silicon nitride core 62 and silica cladding 64 on the substrate 12. By detecting the amount of light transmitted through the alignment waveguides 52 and 52' with one or more external photodetectors (not shown) the waveguides 52 and 52' can be moved relative to each other until they are precisely aligned. This ensures that the passive optical waveguides 26 on the compound semiconductor substrate 14 will also be precisely aligned to corresponding single-mode optical waveguides formed on the silicon, glass or quartz substrate 12. The two substrates 12 and 14 can then be permanently attached together using a UV-cured epoxy 16. The alignment of the two substrates 12 and 14 can be performed using a commercial automated alignment system which can also include the external light source and detector and one or more computer-controlled multi-axis stages for holding the substrates 12 and 14 and aligning one of the substrates 12 or 14 relative to the other substrate.

In lieu of the alignment waveguides 52 and 52' used with an external light source and photodetector as described above or in combination therewith, an internal alignment laser 56 and a pair of alignment photodetectors 58 can be provided on the compound semiconductor substrate 12. The alignment laser 56 and the alignment photodetectors 58 can be formed identically to the laser source 20 and waveguide photodetector 24 described previously, and at the same time. The alignment laser 56 can be activated with an electrical current to provide a lasing output into a curved alignment waveguide 60 which couples the lasing to an edge of the compound semiconductor substrate 14 and therefrom through another curved alignment waveguide 60' formed on the substrate 12 and then back to the alignment photodetector 58. Each alignment photodetector 58 can be used to measure the amount of the lasing output as the two substrates 12 and 14 are moved relative to each other until the detected lasing output is maximized at which point the two substrates 12 and 14 can be permanently attached together as described previously.

Figure 3A:
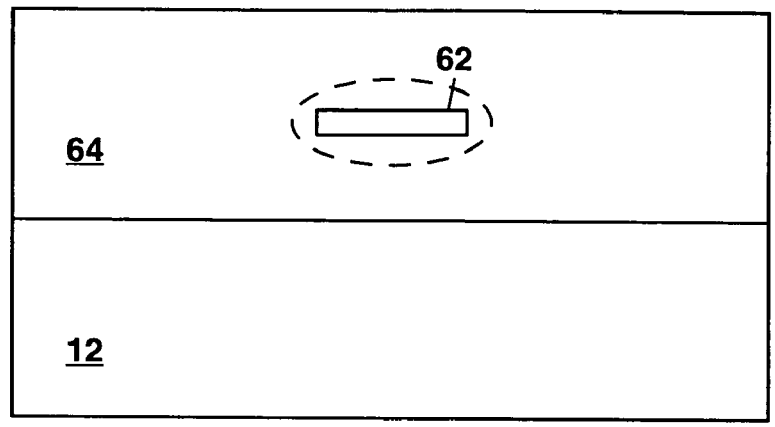
FIG. 3A shows a schematic cross-section view of an optical waveguide formed on another substrate comprising silicon, glass or quartz with the optical waveguide having a silicon nitride waveguide core and a silica cladding.

In the first example of the present invention in FIG. 1, the passive ring resonator 18 can be formed on the silicon, glass or quartz substrate 12 with a waveguide core 62 comprising silicon nitride (or alternately doped silica, a polymer or a high-index glassy material such as $Ta_2O_5$, $Hf_2O_5$ or $TiO_2$) surrounded by a waveguide cladding 64 comprising silica (see FIG. 3A). The term "silica" as used herein can refer to silicon dioxide ($SiO_2$) or to any silicate glass including TEOS (deposited from the decomposition of tetraethylortho silicate by chemical vapor deposition at about 750° C.) and borophosphorous silicate glass (also termed BPSG). The term "silicon nitride" as used herein is intended to refer to stoichiometric silicon nitride ($Si_3N_4$), to non-stoichiometric silicon nitride (i.e. $Si_xN_y$), and also to silicon oxynitride ($Si_xN_yO_z$). The use of silicon nitride with a refractive index of about 2 in combination with silica with a refractive index of about 1.45 provides a relatively large refractive index difference $\Delta n$ which allows the formation of single-mode optical waveguides with a relatively small mode size as indicated by the dashed ellipse in FIG. 2A, and also with relatively low radiation and bending losses.

In FIG. 1, the single-mode optical waveguides are used to form a number of passive optical devices on the silicon, glass or quartz substrate 12 forming the passive ring resonator 18 including the alignment waveguides 52' and 60', a pair of input optical waveguides 54 for receiving the lasing output from each phase modulator 22, a pair of output optical waveguides 54' optically coupled to the waveguide photodetectors 24, a 2×2 evanescent waveguide coupler 66, and a pair of optical splitters 68 located between the 2×2 evanescent waveguide coupler 66 and the input and output optical waveguides 54 and 54'. The input and output optical waveguides 54 and 54' receive the lasing output (also termed lasing light) at the edge of the substrate 12 and couple the lasing output through the optical splitters 68 and coupler 66 to and from the coiled optical waveguide 72. The input and output optical waveguides 54 and 54' preferably have a very low backscatter at the edge of the substrate 12; and this can be achieved either by antireflection coating the ends of the waveguides 54 and 54' or alternately by tilting the waveguides 54 and 54' by a few degrees (e.g. up to about 10 degrees) with respect to the edge of the substrate 12. Each of the above optical devices on the substrate 12 can have a waveguide structure as will be described in detail hereinafter.

Furthermore, an adiabatic mode-matching region 70 can be optionally provided on the substrate 12 at a termination of each input and output optical waveguide 54 and 54', and also at the termination of each optional alignment waveguide 52' and 60'. The adiabatic mode-matching regions 70 facilitate mode matching with the PIC 28 which generally has a slightly larger mode profile for the lasing output than exists on the silicon, glass or quartz substrate 12.

To form the various passive optical devices on the substrate 12, an initial silica layer, which can be about 2-µm-thick, can be deposited or grown over the substrate 12. In the case of a silicon substrate 12, this can be done a conventional thermal steam oxidation process whereby an exposed surface of the silicon substrate 12 is oxidized and converted to silica in a steam ambient at atmospheric pressure or above, and at a high temperature of up to about 1200° C. Once the initial layer of silica is formed on the substrate 12, an additional 1.5–3 µm thickness of silica can then be deposited over the substrate 12 (e.g. TEOS deposited by a plasma-enhanced CVD process). These two layers of silica form a lower portion of the waveguide cladding 64.

A layer of silicon nitride about 0.12–0.15 µm thick can then be blanket deposited over the substrate 12 by LPCVD. The silicon nitride layer can be patterned by reactive ion etching to form the waveguide core 62 for each passive optical device being formed on the substrate 12, with the waveguide core 62 being, for example, 0.8 µm wide for use at 980 nm or 1.2 µm wide for use at 1.55 µm. In other embodiments of the present invention, doped silica, a polymer or a high-index glassy material such as $Ta_2O_5$, $Hf_2O_5$ or $TiO_2$ can be used for the waveguide core 62 in place of the silicon nitride.

Each optical waveguide formed on the silicon, glass or quartz substrate 12 operates in a single mode due to a form birefringence produced by a high aspect ratio of width to thickness of the waveguide core 62. This ensures that the waveguide core 62 in a coiled optical waveguide 72 of the passive ring resonator 18 and other passive optical devices formed on the substrate 12 transmits the lasing output from the laser source 20 which is generated in a fundamental mode having a transverse-electric (TE) polarization state, and that the waveguide core 62 suppresses (i.e. attenuates) the transmission of the lasing output in any other mode including a fundamental mode having a transverse-magnetic (TM) polarization state. The high aspect ratio of the waveguide core 62 further acts to prevent any conversion from the TE polarization state to the TM polarization state and any uncontrolled movement between these two polarization states by providing a significantly different modal effective refractive index and optical phase velocity for these two polarization states.

Once the waveguide core 62 has been formed, an additional 3.5–4 µm of silica can be blanket deposited over the substrate 12 (e.g. as TEOS) to complete formation of the various passive optical devices on the substrate 12. One or more high-temperature annealing steps at 1050–1200° C. for up to a few hours after deposition of the silica and silicon nitride layers can be used to reduce an absorption loss in each of the passive optical devices due to the presence of an H—O bond in the silica and due to an H—N bond in the silicon nitride.

Figure 3B:
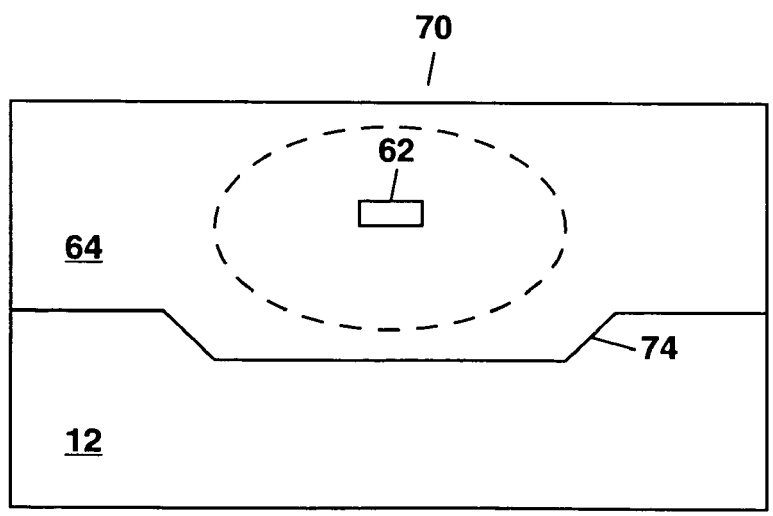
FIG. 3B shows an adiabatic mode-matching region formed proximate to an edge of the substrate in FIG. 3A by providing a channel in the substrate to locally increase the thickness of the silica cladding below the waveguide core which is tapered laterally (i.e. flared inward or outward) in the adiabatic mode-matching region.

To form each optional adiabatic mode-matching region 70 as shown in FIGS. 1 and 3B, a channel 74 can be etched to a uniform depth of up to about 5 µm into the silicon, glass or quartz substrate 12 prior to formation of the silica cladding 64. After the formation of an initial layer of silica by deposition or the thermal steam oxidation process described previously, the initial layer of silica can be planarized to present a flat surface for subsequent depositions of silica and silicon nitride. The use of a planarization step (e.g. by chemical-mechanical polishing) allows the waveguide core 62 to be located at a uniform height over the entire substrate 12. In FIG. 3B, the channel 74 formed in the substrate 12 provides added room for an expanded mode profile (shown by the dashed ellipse in FIG. 3B) for the lasing output in the adiabatic mode-matching region 70 to prevent absorption of the lasing output by the substrate 12 (e.g. when the substrate 12 comprises silicon). This expanded mode profile is produced by tapering or narrowing each side of the waveguide core 62 inward in the adiabatic mode-matching region 70. This inward tapering or narrowing of the waveguide core 62 produces a gradual low-loss expansion of the mode profile with distance towards the edge of the substrate 12.

In FIG. 1, the coiled optical waveguide 72 has a plurality of turns (e.g. 10–100 turns) to provide an overall effective optical path length which can be in the range of 0.5–5 meters with an average diameter for the coil turns of, for example, 15 millimeters, and with a finesse, F, of, for example, F=2 or higher. A waveguide bending loss for this average diameter of the passive ring resonator 18 has been calculated to be about 0.24 dB/turn. A waveguide crossing 76 is also required for each turn of the coiled optical waveguide 72 in order connect an innermost turn of the coiled optical waveguide 72 to the 2×2 evanescent waveguide coupler 66; and each waveguide crossing 76 can present an additional crossing loss of about 0.25 dB. It is expected that this crossing loss can be further reduced by providing a tapered waveguide crossing 76 wherein each intersecting optical waveguide forming the crossing 76 is laterally tapered either inward or outward at the crossing 76 by up to a few tenths of a micron or more.

In the 2×2 evanescent waveguide coupler 66 in FIG. 1, equal amounts of the lasing output are coupled into the coiled optical waveguide 72 of the passive ring resonator 18 in each direction, and equal amounts of the lasing output are coupled out of the coiled optical waveguide 72 of the resonator 18 after propagating around the resonator 18 in each direction. The coupling provided by the 2×2 evanescent waveguide coupler 66 can be, for example, 1% in each direction.

Each optical splitter 68 can be a 2×2 evanescent waveguide splitter formed from two optical waveguides brought close enough together to provide for an evanescent coupling of the lasing output from one optical waveguide to the other optical waveguide similar to the 2×2 evanescent waveguide coupler 66. Such a 2×2 evanescent optical splitter 68 preferably provides a −3 dB coupling for light propagating through the splitter 68 in each direction. An optical waveguide on one side of the 2×2 evanescent waveguide splitter 68 is not used and this optical waveguide can be terminated with a curved waveguide section as shown in FIG. 1.

Figure 4:
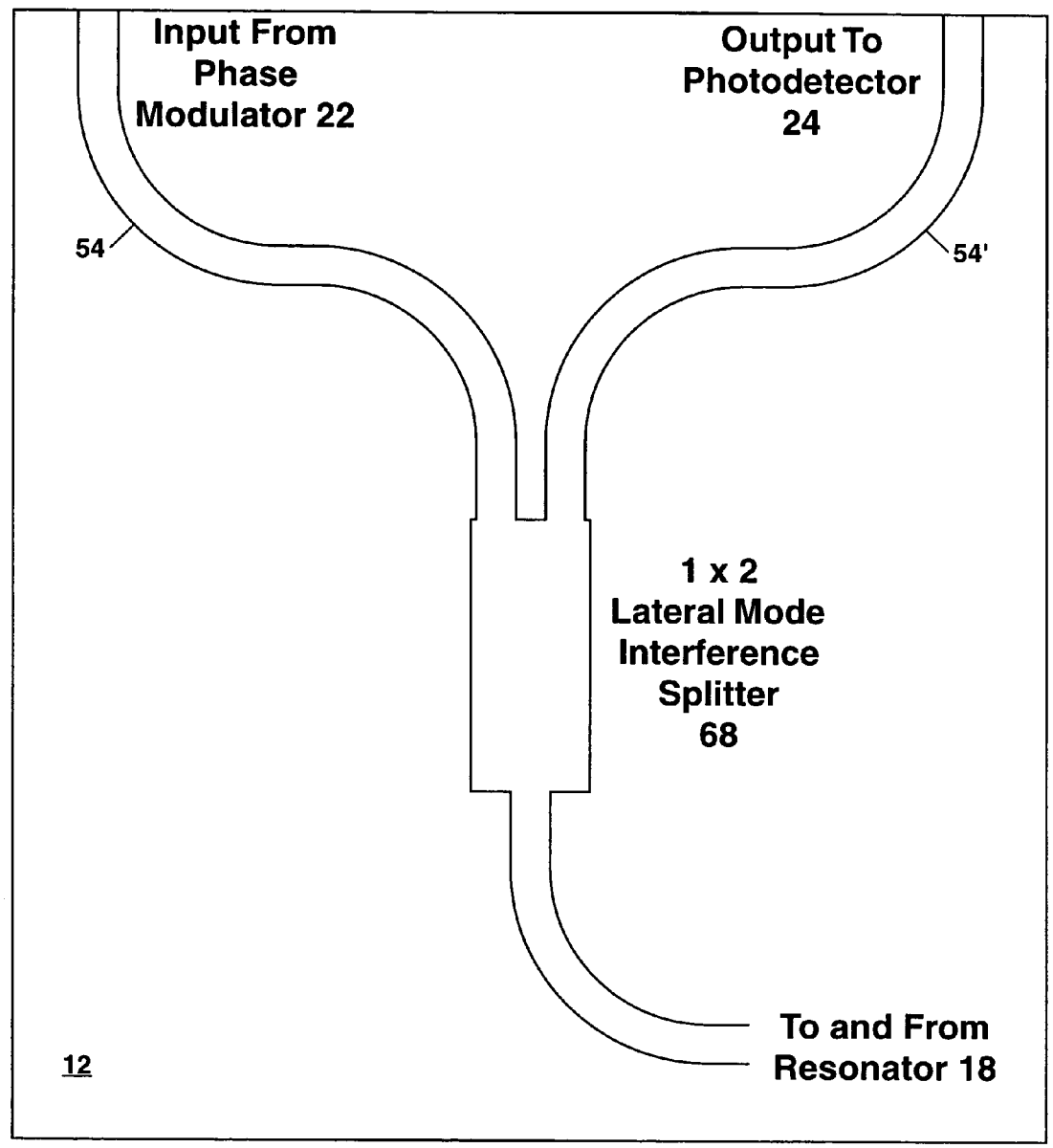
FIG. 4 shows a 1×2 lateral mode interference splitter formed on the silicon, glass or quartz substrate according to the present invention.

Alternately, each optical splitter 68 can comprise a 1×2 lateral mode interference (LMI) splitter 68 which is shown in the schematic plan view of FIG. 4. The 1×2 LMI splitter 68 comprises an oversized waveguide interference section which can be, for example, 3–4 µm wide and 25–75 µm long. A portion of the lasing output from the passive ring resonator 18 enters the 1×2 LMI splitter 68 from a bottom side thereof in FIG. 4 thereby exciting numerous lateral TE modes of the LMI splitter 68 and producing self imaging as is well known by those skilled in the art. This self imaging then excites a fundamental TE mode in each of the waveguides 54 exiting from a top side of the 1×2 LMI splitter 68, thereby splitting the lasing output equally into two parts to produce a −3 dB coupling in this direction. The lasing output from the phase modulator 22 can also enter the 1×2 LMI splitter 68 at the top side thereof and be coupled into the passive ring resonator 18 with a −3 dB loss.

A plurality of passive ring resonators as described above can be formed on a 6-inch-diameter silicon, glass or quartz wafer and can be cut apart after fabrication to provide each individual passive ring resonator on a substrate 12 which is about 20 mm square. After the silicon, glass or quartz substrate 12 is attached to the compound semiconductor substrate 14 as described previously this assembly can be further attached to a heat sink (e.g. comprising copper) and packaged together with electronic circuitry for operation of the device 10 in a conventional dual-in-line package (DIP) about 24×50 mm in size.

The electronic circuitry, which can comprise one or more integrated circuit chips, can drive the bidirectional laser source 20, provide a bias modulation and a serrodyne modulation having an analog or digital sawtooth waveform with a modulation amplitude corresponding to greater than a $2\pi$ phase shift to each phase modulator 22, provide a phase sensitive detection of the output signal from each photodetector 24 and use the detected output signal in a feedback servo loop to drive a voltage controlled oscillator to generate the serrodyne modulation to each phase modulator 22. In this way, both a clockwise and a counterclockwise path in the passive ring resonator 18 can be maintained at resonance so that the rotation rate can be read out from a difference in the serrodyne modulation frequencies applied to each phase modulator 22.

A second example of the integrated optic gyroscope 10 of the present invention is schematically shown in plan view in FIG. 5. In the apparatus 10 of FIG. 5, the PIC 28 can be formed as described previously with reference to FIGS. 1, 2A and 2B except that the alignment waveguides 52 and 60, the alignment laser 56 and the alignment photodetector 58 can be omitted. The PIC 28 in the example of FIG. 5 is used in combination with a passive ring resonator 18' which comprises a single-mode optical fiber 30. The use of the single-mode optical fiber 30 allows the formation of the passive ring resonator 18' with an arbitrary size and length of the single-mode optical fiber 30 which can be advantageous to provide a higher sensitivity for the detection of a much smaller rotation rate than is possible with the example of FIG. 1. However, this increase in sensitivity is at the expense of a device 10 which is generally expected to be less rugged and compact compared with the totally integrated device 10 of FIG. 1.

In FIG. 5, a pair of 1×2 fiber optic splitters 80 are used to couple each lasing output from the edge of the substrate 14 into a 2×2 fiber optic splitter 82 and therefrom into the single-mode optical fiber 30. The 2×2 fiber optic splitter 82 couples about 1–2% of the lasing output into the passive ring resonator 18' formed from the single-mode optical fiber 30. After propagating around the passive ring resonator 18' in each direction, a portion of the lasing output is coupled back through the fiber optic splitters 80 and 82 and to the waveguide photodetectors 24 on the compound semiconductor substrate 14. The 1×2 fiber optic splitters 80 can be connected to the compound semiconductor substrate 14 using an optical adhesive (e.g. a UV-cured epoxy adhesive).

To improve mode matching between the single-mode optical fiber 30 and the passive optical waveguides 26 on the compound semiconductor substrate 14, an adiabatic waveguide coupler (not shown) can be provided on the substrate 14. The adiabatic waveguide coupler can be formed by laterally tapering the waveguide core 34 in a manner similar to that described with reference to FIG. 3B. This provides a lateral and vertical mode expansion of the lasing output in the compound semiconductor substrate 14 to more closely match a mode profile for the single-mode optical fiber 30.

The apparatus 10 of FIG. 5 can be operated in the same manner described previously for the first example integrated optic gyroscope 10 of the present invention. Those skilled in the art will understand that other arrangements for the integrated optic gyroscope 10 are possible according to the teachings of the present invention. For example, the 2×2 evanescent waveguide coupler 66 and the optical couplers 68 formed on the silicon, glass or quartz substrate 12 can be substituted for the fiber optic splitters 80 and 82 in FIG. 5. This can be done, for example, by forming the substrate 12 as in FIG. 1 except with the passive ring resonator 18 being omitted and with the 2×2 evanescent waveguide coupler 66 being connected through a pair of optical waveguides 54 which are terminated with adiabatic mode-matching regions 70 located at the edge of the substrate 12 opposite the compound semiconductor substrate 14. The optical fiber 30 of FIG. 5 can then be connected to this edge of the silicon, glass or quartz substrate 12 to form a device 10 which is more integrated than that of FIG. 5 while providing a sensitivity higher than that of FIG. 1. As another example, the optical couplers 68 can be formed on the compound semiconductor substrate 14 and coupled to an external fiber optic splitter 82 which is further optically connected to the optical fiber 30. This latter arrangement helps to prevent any back reflection or scattering from the edge of the substrate 14 and the ends of the fiber optic splitter 82 connected thereto from being coupled into the passive ring resonator 18'.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An integrated optic gyroscope, comprising:
   (a) a bidirectional laser source formed on a compound semiconductor substrate and providing a lasing output from each end of the bidirectional laser source;
   (b) a pair of optical waveguide phase modulators formed on the compound semiconductor substrate to provide a phase modulation for each lasing output from the bidirectional laser source;
   (c) a plurality of passive optical waveguides formed on the compound semiconductor substrate to direct each lasing output to an edge of the compound semiconductor substrate after passing through one of the optical waveguide phase modulators;
   (d) a passive ring resonator adapted to receive each lasing output from the edge of the compound semiconductor substrate, to propagate each lasing output around the passive ring resonator in a different direction, and to direct a portion of each lasing output out of the passive ring resonator after propagating around the passive ring resonator; and
   (e) a pair of waveguide photodetectors formed on the compound semiconductor substrate and optically coupled to the edge of the compound semiconductor substrate, with the waveguide photodetectors receiving the portion of each lasing output from the passive ring resonator and generating therefrom electrical output signals wherefrom a rotation of the passive ring resonator can be determined.

2. The apparatus of claim 1 wherein the passive ring resonator comprises an optical fiber.

3. The apparatus of claim 2 further comprising a fiber optic splitter to couple each lasing output into the passive ring resonator and to couple the portion of each lasing output out of the passive ring resonator after propagating around the passive ring resonator.

4. The apparatus of claim 1 wherein the passive ring resonator comprises a coiled optical waveguide formed on another substrate.

5. The apparatus of claim 4 wherein the passive ring resonator further comprises an adiabatic mode-matching region located proximate to an edge of the substrate whereon the passive ring resonator is formed to optically couple the passive ring resonator to the passive optical waveguides on the compound semiconductor substrate.

6. The apparatus of claim 4 wherein the coiled optical waveguide comprises a waveguide core of silicon nitride surrounded by a waveguide cladding of silica.

7. The apparatus of claim 4 wherein the coiled optical waveguide includes a waveguide crossing.

8. The apparatus of claim 4 wherein the coiled optical waveguide transmits the lasing output in a transverse-electric (TE) polarization state and suppresses any transmission of the lasing output in a transverse-magnetic (TM) polarization state.

9. The apparatus of claim 4 wherein the passive ring resonator further includes a 2×2 evanescent waveguide coupler and a pair of 1×2 lateral mode interference splitters to couple each lasing output into the passive ring resonator, and to couple the portion of each lasing output out of the passive ring resonator after propagating around the passive ring resonator.

10. The apparatus of claim 1 wherein the bidirectional laser source comprises a distributed feedback (DFB) laser.

11. The apparatus of claim 1 wherein the bidirectional laser source and the pair of waveguide photodetectors comprise a plurality of compound semiconductor layers epitaxially deposited on the compound semiconductor substrate, with the plurality of compound semiconductor layers including at least one quantum well therein.

12. The apparatus of claim 11 wherein the optical waveguide phase modulators and the passive optical waveguides are formed from the plurality of compound semiconductor layers with each quantum well therein being disordered or etched away at the locations of the optical waveguide phase modulators and at the locations of the passive optical waveguides.

13. The apparatus of claim 11 wherein the bidirectional laser source is electrically isolated from each optical waveguide phase modulator by an ion-implanted region extending partway through the plurality of compound semiconductor layers.

14. The apparatus of claim 4 wherein each substrate includes a plurality of alignment waveguides formed thereon.

15. The apparatus of claim 4 wherein the two substrates are attached together edge-to-edge with a UV-cured epoxy adhesive.

16. The apparatus of claim 1 wherein the compound semiconductor substrate further includes an alignment laser optically coupled to an alignment waveguide formed on the compound semiconductor substrate.

17. The apparatus of claim 16 wherein the compound semiconductor substrate further includes an alignment photodetector optically coupled to the alignment waveguide on the compound semiconductor substrate.

18. An integrated optic gyroscope, comprising:
(a) a passive ring resonator formed on a first substrate, with the passive ring resonator further comprising:
  (i) a coiled optical waveguide having a plurality of loops;
  (ii) a pair of input optical waveguides optically coupled to the coiled optical waveguide to receive lasing light from an edge of the first substrate and to convey the lasing light into the coiled optical waveguide in each of two counterpropagating directions; and
  (iii) a pair of output optical waveguides optically coupled to the coiled optical waveguide to receive a portion of the lasing light out from the coiled optical waveguide and to convey the portion of the lasing light to the edge of the first substrate after propagating around the coiled optical waveguide; and
(b) a photonic integrated circuit formed on a second substrate, and further comprising:
  (i) a bidirectional distributed feedback (DFB) laser to generate the lasing light and to emit the lasing light from each end thereof;
  (ii) a pair of optical waveguide phase modulators optically coupled to each end of the DFB laser to provide a phase modulation for the lasing light;
  (iii) a passive optical waveguide to convey the lasing light from each optical waveguide phase modulator to an edge of the second substrate wherefrom the lasing light is coupled into the input optical waveguides on the first substrate; and
  (iv) a waveguide photodetector to receive the portion of the lasing light from each output optical waveguide on the first substrate and to generate therefrom an electrical output signal indicative of a rotation rate of the passive ring cavity.

19. The apparatus of claim 18 wherein the first substrate comprises silicon, glass or quartz; and the second substrate comprises a III–V compound semiconductor.

20. The apparatus claim 19 wherein the passive ring resonator, each input optical waveguide and each output optical waveguide comprise a waveguide core surrounded by a waveguide cladding of silica.

21. The apparatus of claim 18 wherein the passive ring resonator is adapted to transmit the lasing light from the DFB laser in a transverse electric (TE) mode and to attenuate any transmission of the lasing light in a transverse magnetic (TM) mode.

22. The apparatus of claim 18 wherein the input optical waveguides and the output optical waveguides are optically coupled to the coiled optical waveguide through a 2×2 evanescent waveguide coupler.

23. The apparatus of claim 22 wherein the input optical waveguides and the output optical waveguides are further optically coupled to the coiled optical waveguide through a pair of 1×2 lateral mode interference splitters.

24. The apparatus of claim 18 wherein each input optical waveguide and each output optical waveguide on the first substrate includes an adiabatic mode-matching region formed proximate to the edge of the first substrate.

25. The apparatus of claim 18 wherein the coiled optical waveguide includes at least one waveguide crossing.

26. The apparatus of claim 18 wherein the photonic integrated circuit further comprises a plurality of compound semiconductor layers epitaxially grown on the second substrate.

27. The apparatus of claim 26 wherein the plurality of compound semiconductor layers comprise III4–V compound semiconductor layers including a pair of low-refractive-index cladding layers sandwiched about a high-refractive-index core layer.

28. The apparatus of claim 27 wherein the high-refractive-index core layer includes at least one quantum well therein.

29. The apparatus of claim 28 wherein each quantum well is disordered within the pair of the optical waveguide phase modulators, and within each passive optical waveguide.

30. The apparatus of claim 27 wherein one of the pair of low-refractive-index cladding layers includes a grating formed therein at the location of the DFB laser.

31. The apparatus of claim 18 wherein an electrical isolation region is provided between each optical waveguide phase modulator and the DFB laser.

32. The apparatus of claim 18 wherein the first and second substrates are attached together at the edges thereof.

33. The apparatus of claim 32 wherein the first and second substrates include a plurality of alignment waveguides to align the input and output optical waveguides on the first substrate to the passive optical waveguides on the second substrate in preparation for attaching the first and second substrates together.

34. The apparatus of claim 33 wherein the second substrate further includes an alignment laser optically coupled to at least one of the alignment waveguides on the second substrate.

35. The apparatus of claim 33 wherein the second substrate further includes an alignment photodetector optically coupled to at least one of the alignment waveguides on the second substrate.

36. A method for forming an integrated optic gyroscope, comprising steps for:
(a) epitaxially growing on a compound semiconductor substrate a plurality of compound semiconductor layers including at least one quantum well layer;
(b) forming a plurality of active optical elements from the compound semiconductor layers including a bidirectional laser source and a pair of waveguide photodetectors;
(c) disordering or etching away a portion of the compound semiconductor layers and forming therefrom a pair of optical waveguide phase modulators optically coupled to the bidirectional laser source and a plurality of passive optical waveguides, with the passive optical waveguides connecting the pair of the optical waveguide phase modulators and the pair of waveguide photodetectors to an edge of the compound semiconductor substrate; and
(d) connecting a passive ring resonator to the edge of the compound semiconductor substrate, with the passive ring resonator being optically coupled to the plurality of passive optical waveguides to receive a phase-modulated lasing output from the laser source and each optical waveguide phase modulator, and to direct a portion of the phase-modulated lasing output to each waveguide photodetector after propagating the phase-modulated lasing output around the passive ring resonator.

37. The method of claim 36 wherein the passive ring resonator comprises an optical fiber.

38. The method of claim 36 wherein the passive ring resonator comprises a coiled optical waveguide formed on a silicon, glass or quartz substrate.

39. The method of claim 36 wherein the step for connecting the passive ring resonator to the edge of the compound semiconductor substrate comprises attaching the passive ring resonator to the edge of the compound semiconductor substrate with an adhesive.

* * * * *